Patented May 31, 1938

2,118,881

UNITED STATES PATENT OFFICE 2,118,881

MANUFACTURE OF ALCOHOLS

Alfred W. Francis, Woodbury, N. J., assignor to Socony-Vacuum Oil Company, Incorporated, New York, N. Y., a corporation of New York No Drawing. Application March 9, 1934, Serial No. 714,824

9 Claims. (Cl. 260—156)

This invention relates to the manufacture of alcohols, and has to do with the manufacture of these compounds by the hydration of the corresponding olefines. It is exemplified by the manufacture of butanols, butene-1 and/or butene-2 being hydrated for the production of secondary butanol, and isobutene being hydrated for the production of tertiary butanol.

According to the processes known to the art at the present time, these alcohols are made by absorbing the proper olefine in relatively concentrated sulfuric acid for the production of the corresponding alkyl sulfates. The mixture of alkyl sulfates and unreacted sulfuric acid is then diluted with considerable water in order to hydrolyze the alkyl sulfate to the corresponding alcohol, or alternately partially neutralized to bring about the same result, and the alcohol recovered from the resulting reaction mixture by a process of direct distillation. The major disadvantage of this prior art process is the consumption of sulfuric acid. In the formation of each mole of alcohol produced, at least one mole of sulfuric acid, and usually more than this amount, enters into the reaction. Upon the completion of the reaction, this mole of sulfuric acid reappears in a highly diluted or partially diluted and neutralized form. It cannot be reused in the process without concentration and restoration if partially neutralized. The expense of such concentration and restoration may be greater than the cost of new acid, and will in most cases be of at least the same magnitude, so the process of the prior art may really be considered to consume at least one mole of sulfuric acid per mole of alcohol produced.

In addition, the known process is one which requires two steps between the preparation of olefines and the distillation of alcohol from the reaction mixture, each with its difficulties of control, each having its opportunities for spoilage of product, loss of reagent, formation of side products, and the like, and each imposing its own peculiarities of reaction velocity, special conditions of operation, and completeness of reaction upon the overall efficiency of the combined process.

It has been a major object of this invention to overcome these difficulties by devising a process in which a single operating step suffices to pass from the olefine to the alcohol containing reaction product. A further object has been to devise a process of such direct hydration of olefines to alcohols capable of high yields and amenable to economic control. One of the principal objects has been to devise a process wherein a minimum use of sulfuric acid is made per unit of alcohol produced, and in which that sulfuric acid is regained from the reaction product in a condition which enables it to be used again in the process without expensive concentration and restoration. A further object has been the provision of a process capable of working upon an olefine raw material which is in the form of a liquid of a relatively high degree of purity. Further objects are the provision of a process whereby a product such as secondary butanol may be economically recovered from the reaction mixture in which it originates without losses by decomposition, and such further objects and advantages as may hereinafter appear.

The process of the invention may be summarily described as one in which liquid olefines are heated under pressure in an autoclave whilst being agitated, in contact with dilute sulfuric acid or other equivalent strong, nonvolatile mineral acid such as phosphoric acid. The efficiency of the process is subject to the control of temperature, pressure, concentration of sulfuric acid, and other factors which are later discussed in more detail.

To explain, for an example of the process, the manufacture of butanols, the olefine raw material preferred for the process of this invention consists of substantially pure butenes, or a mixture of butene-1 and butene-2, if the alcohol to be made is secondary butanol, or substantially pure isobutene, if the alcohol to be made is tertiary butanol. These olefines are introduced in a liquid or highly condensed form, and may be initially prepared by any method available, although the preferred method of preparation is by solution in and recovery from silver nitrate solutions. The preferred source of such olefines is the gas recovered in the operation of cracking hydrocarbon oils.

One of the general characteristics of the invention is the capability of producing two or three moles of secondary butanol, or ten to twenty moles of tertiary butanol, per mole of sulfuric acid originally introduced to the reaction. A further characteristic is that this sulfuric acid is recovered, after distillation from the reaction mixture of the alcohol formed, in a condition such that it may be returned directly to the primary reaction. What this amounts to from an economic standpoint is that the consumption of acid in the process is in reality zero, except for leakage, spills, and mechanical and other losses of like nature.

A broad statement of the operating characteristics of the process of the invention may be made as follows. The temperature of the reaction is that temperature at which the rate of reaction is found to be favorable. The preferred pressure to be held upon the reaction mixture is one sufficiently great to keep the olefine liquid at the temperature of reaction, (or at least of a density approaching that of a liquid in order that contact with the reagents may be had). The acid used should have a concentration not greater than about 65% with respect to water to avoid side reactions which have been found to take place to an objectionable extent with stronger acid. It is preferred that the relative amounts of olefine and water be such that the water is slightly in excess. For example, the preferred amount is one such that the water present is about 20 per cent to 30 per cent in excess of that amount equivalent to the olefine present. This slight excess of water is desirable to avoid side reactions, as for instance, excessive formation of di-secondary butyl ether when the desired product is secondary butanol. Agitation of the reaction mixture is necessary, as the system tends to part into two liquid layers.

In the manufacture of secondary butanol, the starting material is butene-1 or butene-2, or a mixture of these in substantially pure condition in the form of a liquid. The concentration of sulfuric acid preferred is 60 to 65 per cent, as polymerization of the olefine is likely to occur with acids stronger than 65%. The relative amounts of reagents are such that water is present to the extent of 20 to 30 per cent in excess of the olefine, as pointed out above. The reaction temperature preferred is 60° to 70° C. Lower temperatures can be used, but the rate of reaction becomes uneconomically slow with much decrease in temperature. On the other hand, 70° C. is the preferable upper limit for the reaction temperature for the formation of secondary butanol. At higher temperatures the equilibrium corresponds to only 30 to 40 per cent hydration, and results in a two phase liquid product so that only low yields may be expected. At temperatures slightly lower than 70° C., enough alcohol is formed to produce a homogeneous reaction mixture so that hydration proceeds to 80 or 90 per cent of completion. The temperature which distinguishes between these two alternate results varies slightly with the concentration of the sulfuric acid and the purity of the olefine, but with a given pair of reagents is very sharp, a difference of one degree allowing more than double the yield in one case than in the other.

The preferred pressure held upon the reaction mixture is substantially equal to or in excess of the vapor pressure of the olefine at the reaction temperature. When operating with butenes at a temperature of 70° C., it is preferably about 115 pounds per square inch, gauge.

Under the preferred conditions outlined, the reaction is practically complete after about three hours. When complete, the reaction mixture may then be distilled directly to recover the alcohol formed, but minimum losses of alcohol occasioned by reversal of synthesis during distillation may be had if the reaction mixture is diluted somewhat with water. The amount of water is preferably substantially equal to that consumed in the hydration plus that to be withdrawn with the alcohol as a constant boiling mixture in the following distillation. The reason for this preferred dilution is to place the distillation residue at a concentration which will permit immediate return to the synthesis step.

The alcohol is then distilled from the reaction mixture. This distillation is carried out by heating the mixture to some temperature, for example, 70° C., considerably below its boiling point, and passing a gas through it. The preferred gas for this use is the same olefine which has been used in synthesizing the alcohol, since this aids in suppressing decomposition. This suppression of decomposition is the reason for the reduced temperature of distillation, since at the boiling point of the mixture, about 110° C. at atmospheric pressure, there would be a serious loss of alcohol by reversal of its synthesis. In this connection, the term boiling point is intended to mean that temperature at which there is substantial evolution of a gaseous phase, regardless of its nature or origin. An inert gas, or vacuum distillation also may be used, but these methods are much less efficient as a means of avoiding decomposition.

The condensed collected distillate will consist usually of two liquid layers. The upper or alcohol layer may be separated, and, if desired, dried by any of the usual methods known to the art, as for example by use of salt, caustic soda, etc. The residue from the distillation consists of sulfuric acid, suitable in purity and concentration for direct return for use in another hydration reaction.

For the manufacture of tertiary butanol, the starting olefine is isobutene. In this case, the much greater reactivity of isobutene permits the use of a more dilute sulfuric acid, a strength of 5 to 10 per cent being satisfactory, though as little as 0.5 per cent may give a useful result. In this case, the maximum temperature for a homogeneous reaction mixture at equilibrium is about 115° C. Reaction temperatures not too far below this give good results, a convenient temperature being 100° C., at which the required pressure is about 250 pounds per square inch gauge. Under these conditions, the reaction will usually be completed in about one hour. The reaction product is then diluted slightly, as in the case of the first explained operation, and passed to the distillation step.

The distillation of the reaction mixture containing tertiary butanol can be carried out directly at atmospheric temperature without the use of gas, since its boiling temperature, (about 90° C.), is sufficiently below the reaction temperature to avoid decomposition.

In this case, the condensed and collected distillate presents a single phase, and contains about 87 per cent tertiary butanol by weight. This product can likewise be dried by any of the usual methods, if it is desirable.

In the disclosure of this invention herein set forth and particularly in the explanatory matter, the statements of temperatures, pressures, concentrations, reagents used and other data are given in an exemplary manner only, and it is not intended that the invention be limited thereby, but only by such limitations as may appear in the appended claims.

What is claimed is:

1. In the process for the preparation of secondary butanol from a normal butene, the steps which comprise bringing the butene into intimate contact with sulphuric acid of a strength not greater than 65 per cent, and in the absence of any substantial amount of catalyst other than sulphuric acid, heating the mixture to a temperature not in excess of 70 degrees centigrade under an elevated pressure of about the same magnitude as the vapor pressure of butene at that temperature, continuously agitating the mixture, and subsequently releasing the pressure and distilling the alcohol from the reaction mixture.

2. In the process for the preparation of secondary butanol from a normal butene, the steps which comprise bringing the butene into intimate contact with sulphuric acid of a strength not greater than 65 percent, and in the absence of any substantial amount of catalyst other than sulphuric acid, heating the mixture to a temperature not in excess of 70 degrees centigrade under an elevated pressure of about the same magnitude as the vapor pressure of butene at that temperature, continuously agitating the mixture, and subsequently releasing the pressure and distilling the alcohol from the reaction mixture in the presence of added gaseous butene and at a temperature below that at which the reaction mixture alone would evolve substantial amounts of a gaseous phase.

3. In the manufacture of secondary butanol from normal butene, the steps which comprise bringing the normal butene into intimate contact with a solution containing a strong non-volatile mineral acid and water, heating the mixture thus obtained under elevated pressure whilst agitating it, the relative amounts of the butene and water in the said mixture being such that the water is about 20 percent to 30 percent in excess of the chemical equivalent of the butene, the temperature of the mixture being below that temperature at which insufficient alcohol is formed by reversal of the synthesis to produce a homogeneous reaction mixture at equilibrium and the concentration of the acid being not greater than about 65%.

4. In the manufacture of secondary butanol from normal butene, the steps which comprise bringing the normal butene into intimate contact with a solution containing a strong non-volatile mineral acid and water, heating the mixture thus obtained whilst agitating it, maintaining upon the reaction mixture a pressure sufficiently great to keep the butene of a density at least approaching that of the butene in a liquid condition and separating the alcohol from the reaction mixture, the relative amounts of butene and water in the said mixture being such that the water is present in an amount which is about 20 percent to 30 percent in excess of its equivalent weight of the butene, the temperature of the mixture being below that temperature at which insufficient alcohol is formed by reversal of the synthesis to produce a homogeneous reaction mixture at equilibrium and the concentration of the acid being not greater than about 65%.

5. In the manufacture of secondary butanol from normal butene, the steps which comprise bringing the normal butene into intimate contact with a solution containing sulphuric acid and water, heating the mixture thus obtained under elevated pressure whilst agitating it, the relative amounts of butene and water in the said mixture being such that the water is about 20 percent to 30 percent in excess of the chemical equivalent of the butene, the temperature at which the mixture is heated being not greater than about 70 degrees centigrade and the concentration of the acid being not greater than about 65%.

6. In the manufacture of secondary butanol from normal butene, the steps which comprise bringing the butene into intimate contact with a solution containing sulphuric acid and water, heating the mixture thus obtained whilst agitating it, maintaining upon the reaction mixture a pressure sufficiently great to keep the butene of a density at least approaching that of the butene in a liquid condition and separating the alcohol from the reaction mixture, the relative amounts of butene and water in the said mixture being such that the water is present in an amount which is about 20 percent to 30 percent in excess of its equivalent weight of the butene, the temperature at which the mixture is heated being between about 60 degrees centigrade and about 70 degrees centigrade and the concentration of the acid being not greater than about 65%.

7. In the manufacture of secondary butanol from a butene the steps which comprise bringing the butene into intimate contact with a solution containing a strong non-volatile mineral acid and water, heating the mixture thus obtained under elevated pressure whilst agitating it, the temperature of the mixture being below that temperature at which insufficient alcohol is formed by reversal of the synthesis to produce a homogeneous reaction mixture at equilibrium and the concentration of the acid being not greater than about 65%, and the pressure upon the mixture being sufficient to keep the butene of a density at least approximating that of the butene in a liquid condition.

8. In the manufacture of secondary butanol from a normal butene, the steps which comprise bringing the normal butene into intimate contact with a solution containing a strong non-volatile mineral acid, heating the mixture thus obtained under elevated pressure whilst agitating it, the temperature of the mixture being below that temperature at which insufficient alcohol is formed by reversal of the synthesis to produce a homogeneous reaction mixture at equilibrium and the concentration of the acid being not greater than about 65%, and the pressure upon the mixture being sufficient to keep the butene of a density at least approximating that of the butene in a liquid condition.

9. In the manufacture of secondary butanol from a normal butene, the steps which comprise bringing the normal butene into intimate contact with a solution containing a strong non-volatile mineral acid, heating the mixture thus obtained under elevated pressure whilst agitating it, the temperature of the mixture being below that temperature at which insufficient alcohol is formed by reversal of the synthesis to produce a homogeneous reaction mixture at equilibrium and the concentration of the acid being not greater than about 65%, and the pressure upon the mixture being sufficient to keep the butene of a density at least approximating that of the butene in a liquid condition, and separating the alcohol from the reaction mixture by distillation at a temperature below the boiling point of the mixture in a current of gas.

ALFRED W. FRANCIS.